United States Patent
Mähringer

(10) Patent No.: US 6,927,732 B2
(45) Date of Patent: Aug. 9, 2005

(54) COMMUNICATION TERMINAL WITH ANTENNA

(75) Inventor: Claus Mähringer, Neukirchen-Vluyn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/451,023

(22) PCT Filed: Dec. 18, 2001

(86) PCT No.: PCT/DE01/04788

§ 371 (c)(1),
(2), (4) Date: Jun. 19, 2003

(87) PCT Pub. No.: WO02/50944

PCT Pub. Date: Jun. 27, 2002

(65) Prior Publication Data

US 2004/0051674 A1 Mar. 18, 2004

(30) Foreign Application Priority Data

Dec. 19, 2000 (DE) .......................... 100 63 242

(51) Int. Cl.⁷ ................................. H01Q 1/24
(52) U.S. Cl. ................. 343/702; 343/700 MS
(58) Field of Search .................... 343/700 MS, 702, 343/787

(56) References Cited

U.S. PATENT DOCUMENTS

| 4,439,640 | A | | 3/1984 | Takaya |
| 5,213,234 | A | * | 5/1993 | Stefanopoulos ............ 222/78 |
| 5,848,170 | A | * | 12/1998 | Mahieux et al. ............ 381/92 |
| 5,899,685 | A | * | 5/1999 | Thigpen ..................... 431/144 |
| 6,084,975 | A | * | 7/2000 | Perkins ....................... 381/326 |
| 6,356,379 | B1 | * | 3/2002 | Kreymerman ............ 359/305 |
| 6,535,108 | B1 | * | 3/2003 | Schrott et al. ............ 340/10.1 |

FOREIGN PATENT DOCUMENTS

| DE | 197 52 189 | 5/1999 |
| EP | 0 924 793 | 6/1999 |
| EP | 1 003 317 | 5/2000 |
| EP | 1 184 936 | 3/2002 |
| WO | WO 00/30268 | 5/2000 |
| WO | WO 00/38475 | 6/2000 |

OTHER PUBLICATIONS

CardTech/SecurTech '99 Gateway to Practical Innovation, Conference Proceedings.

* cited by examiner

Primary Examiner—Tho Phan
(74) Attorney, Agent, or Firm—Bell Boyd & Lloyd LLC

(57) ABSTRACT

A communication terminal is provided with an electromagnetic transmission or receiving antenna, an acoustic converter, preferably housed in a mobile telephone or cordless telephone.

12 Claims, 1 Drawing Sheet

COMMUNICATION TERMINAL WITH ANTENNA

BACKGROUND OF THE INVENTION

The present invention relates to a communication terminal with an electromagnetic transmission or receiving antenna and at least one energizable device for acoustic sound conversion.

Communication terminals are subject to a constant size-reduction process. As such, it is essential to make optimum use of the available space in the communication terminal. The function of individual components is optimized and their size minimized. However, this can only be achieved subject to compromises with respect to the function and size of the components. This also affects components, the performance of which depends directly on their geometric dimensions. Examples of such are loudspeakers and their effective membrane surface or a planar antenna as-used in a mobile telephone and its dimensions.

A communication terminal is disclosed in WO 00/38475, the housing of which houses a loudspeaker and an antenna. The loudspeaker is configured as an acoustic resonance chamber and it is located either wholly or partially in the electromagnetic resonance chamber of the antenna serving as the support.

A radio telephone is disclosed in WO 00/30268 which includes a patch antenna. This patch antenna has a "speaker 35" mounted on one side of the antenna, connected to a "front face" through holes in the antenna.

Minimization of the individual components is achieved by combining different functions in one component. In the case of a mobile telephone, for example, an electrodynamic acoustic converter, also referred to as a receiver, is used. The receiver includes a number of acoustic sound conversion functions.

The main function of the receiver is its operation as an earpiece for the typical use of a mobile telephone at the ear.

The receiver is also used for ringtone generation, sometimes referred to as buzzer function. The receiver here is operated as a buzzer.

Mobile radio terminals also often includes a handsfree speaking or listening option with an additional loudspeaker function for open listening. In this case, the receiver is operated as a loudspeaker.

All three functions impose very different requirements on the receiver.

In the case of ringtone generation, high acoustic pressure levels are generated via the receiver. These are typically around 100 dB(A) at a distance of 5 cm from the receiver. With typical membrane diameters of 13 mm, high acoustic pressure levels are generated via resonant frequency response on the part of the receiver in the frequency range of 2000 Hz to 4000 Hz.

If the receiver is operated as an earpiece for a standard earphone, it operates on a more or less closed air volume in the ear, known as the acoustic load. It should then have a flat frequency response in the range of 300 Hz to 3600 Hz.

The handsfree listening option also requires the generation of high acoustic pressures. Radiation with a flat frequency response is necessary in order to reproduce speech naturally. However, small membrane diameters only allow higher acoustic pressures, typically upwards of 700 Hz, resulting in compromises in sound quality. The receiver here operates on an open air volume.

When the functions of operation as an earpiece for an earphone and buzzer function for ringtone generation are combined, their frequency response requirements are conflicting. In the case of ringtone generation, a considerable amount of electrical power is converted, resulting in significant heating of the receiver. This heating reduces the life of the receiver and modifies its frequency response in the long term.

When the additional function for handsfree listening and the function of operation as an earpiece in a receiver are combined, the associated acoustic loads of open or closed air volume, on which the receiver operates, are different.

If all three functions described are combined in one receiver, compromises are made with all three functions. Possible limitation of these compromises by digital signal processing is only possible to a limited degree, without significantly restricting the required dynamic range or generating other unwanted secondary effects, such as noise or distortion.

In existing mobile telephones these three functions are combined in a very small receiver.

An object of the present invention, therefore, is to create an acoustic sound conversion function that takes up little space and does not restrict other acoustic sound conversion functions in a communication terminal.

SUMMARY OF THE INVENTION

In the case of a communication terminal a function of ringtone generation is removed from a receiver unit and created using an existing antenna.

In a mobile telephone there is often advantageously a two-dimensional, planar antenna. Its surface is not simply a part of the transmission or receiving antenna for electromagnetic waves, but it also can be used to generate sound. This relatively large and available antenna surface can be used to generate and radiate a correspondingly high level of acoustic power. Planar antennas used here such as patch or PIF antennas, which include a planar emitter and a reflector, are particularly suitable.

However, any forms and configurations are possible for the antennas used and these are not restricted to the configuration below. It is only significant for the antennas used that they have a surface which also can be used to generate acoustic oscillations. Conceivable antenna structures could, for example, be attached to non-metallic supports. These could be energized electromechanically or electrodynamically to radiate sound.

The antenna includes an energizable device for acoustic sound conversion. This device may include both an electromechanical and an electrodynamic acoustic sound converter.

A shaped membrane is, for example, incorporated in the surface of a planar antenna to generate sound. The membrane is advantageously made of metal. The membrane could be configured as a thinner section of material in the antenna surface, connected continuously or only partially to the antenna surface.

The membrane advantageously contains a piezo-ceramic layer. This piezo-ceramic layer is deformed by applying an electrical voltage based on the piezo-electrical effect. This also deforms the membrane. Appropriate control of the piezo-ceramic layer allows sound waves to be generated and radiated.

The antenna surface used and, therefore, also the metal membrane are advantageously applied to a direct-current balancing potential. As such, the antenna surface can be used as an electrical counter-contact for the piezo-ceramic layer. This allows simple control of the piezo-ceramic layer via electrical voltage.

Piezo-electrical materials are characterized by a significant interaction between their electrical and mechanical characteristics. Applying an electrical field produces mechanical deformations. Mechanical pressure on these materials, however, generates electrical charges. The structure described here, therefore, also allows sound signals to be picked up, in principle.

This combination results in the condition of resonant frequency response of ringtone generation in the receiver not being required. The receiver that is still required only includes the function of a loudspeaker for standard earphone operation and, where necessary, that of a loudspeaker for a handsfree listening option.

The receiver is now independent of ringtone generation. As such, the restrictions and necessary compromises in the receiver are fewer and there is a greater degree of freedom for its creation. It is now possible to optimize the functions in the receiver better with fewer compromises.

The receiver itself can be configured to be smaller and, therefore, to take up less space. The costs and development work required to create three functions in one component and additional component costs are avoided. The creation of a communication terminal is less expensive with the invention described here.

There are areas of application for the present invention in all communication terminals with antennas, such as, for example, in mobile telephones and cordless telephones.

Additional features and advantages of the present invention are described in, and will be apparent from, the following Detailed Description of the Invention and the Figures.

DETAILED DESCRIPTION OF THE INVENTION

Figure 1:
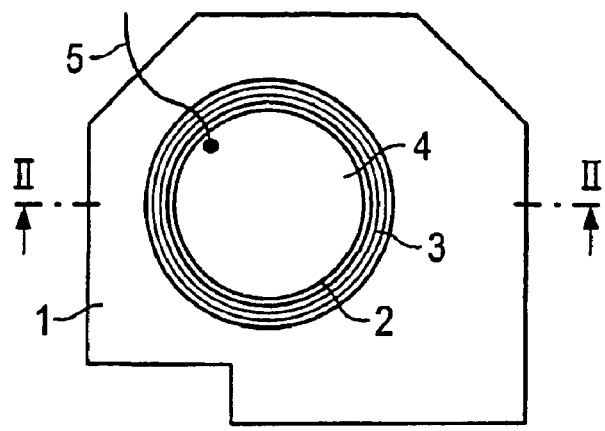
FIG. 1 shows an antenna surface with a shaped membrane and piezo-ceramic layer.
Figure 2:
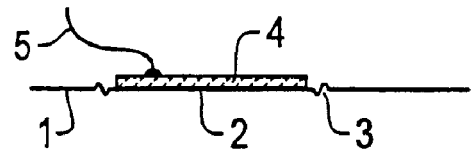
FIG. 2 shows a section through the antenna surface along the line II—II from FIG. 1.

FIG. 1 and FIG. 2 show an antenna surface 1 of a planar antenna, a shaped membrane 2, a shaped membrane crease 3, a piezo-ceramic layer 4 attached to the membrane 2 and an electrical connection 5 on the piezo-ceramic layer 4. A section along the section line II—II is also marked in FIG. 1, and is shown below in FIG. 2.

The membrane crease 3 is formed on the antenna surface 1, creating a membrane 2 capable of oscillation. The piezo-ceramic layer 4 is attached to this membrane 2. Contact is established with this piezo-ceramic layer 4 via the electrical connection 5 on the piezo-ceramic layer 4. The piezo-ceramic layer. 4 is controlled with electrical signals via the electrical connection 5 on the piezo-ceramic layer 4.

Figure 3:
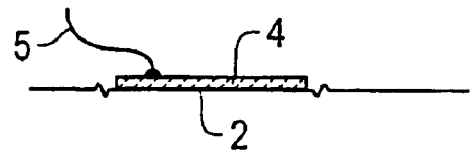
FIG. 3 shows the rest position of the membrane with a piezo-ceramic layer with no voltage applied.

FIG. 3 shows the rest position of the membrane 2, the piezo-ceramic layer 4 attached to it and the electrical connection 5 of the piezo-ceramic layer 4.

When no electrical voltage is applied to this electrical connection 5 on the piezo-ceramic layer 4, the piezo-ceramic layer 4 does not deform, the membrane 2 is not mechanically tensioned and no acoustic sound is generated.

Figure 4:
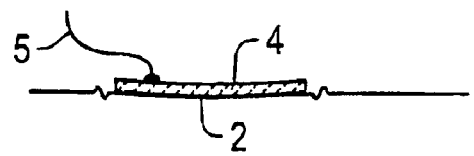
FIG. 4 shows the tensioned membrane with the piezo-ceramic layer with voltage applied.

FIG. 4 shows the tensioned position of the membrane 2, the piezo-ceramic layer 4 attached to it and the electrical connection 5 on the piezo-ceramic layer 4.

If an electrical voltage is applied to this electrical connection 5 on the piezo-ceramic layer 4, the piezo-ceramic layer 4 deforms and the membrane 2 is tensioned downwards mechanically. Acoustic sound is generated by the transition from the rest position to the tensioned position.

Figure 5:
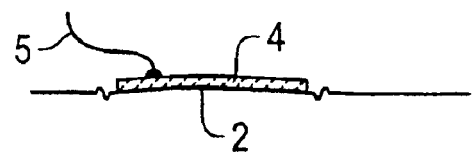
FIG. 5 shows the tensioned membrane with the piezo-ceramic layer with inverted voltage applied.

FIG. 5 shows the tensioned position of the membrane 2, the piezo-ceramic layer 4 applied to it and the electrical connection 5 on the piezo-ceramic layer 4.

If an inverted electrical voltage is applied to this electrical connection 5 on the piezo-ceramic layer 4, the piezo-ceramic layer 4 deforms and the membrane is tensioned upwards mechanically. Acoustic sound is generated by the transition from the rest position to the tensioned position.

Although the present invention has been described with reference to specific embodiments, those of skill in the art will recognize that changes may be made thereto without departing from the spirit and scope of the present invention as set forth in the hereafter appended claims.

What is claimed is:

1. A communication terminal, comprising:

an electromagnetic antenna for at least one of transmitting and receiving; and at least one energizable device for acoustic sound conversion, wherein at least part of the electromagnetic antenna includes an antenna surface configured as a support for the energizable device, with the energizable device having a membrane formed from and including part of the antenna surface for acoustic sound conversion.

2. A communication terminal as claimed in claim 1, wherein the acoustic sound conversion is performed at least one of electrodynamically and electromechanically.

3. A communication terminal as claimed in claim 1, wherein the membrane is configured for acoustic sound generation.

4. A communication terminal as claimed in claim 1, wherein the membrane is shaped via a membrane crease.

5. A communication terminal as claimed in claim 4, wherein the membrane is connected continuously through the membrane crease to the surrounding antenna surface.

6. A communication terminal as claimed in claim 4, wherein the membrane is connected only partially through the membrane crease to the surrounding antenna surface.

7. A communication terminal as claimed in claim 1, wherein the membrane is configured as a metal and is capable of oscillation.

8. A communication terminal as claimed in claim 1, wherein the membrane is configured as a thinner section of material in part of the antenna.

9. A communication terminal as claimed in claim 1, wherein the membrane has a piezo-ceramic layer.

10. A communication terminal as claimed in claim 9, wherein the antenna surface has an electrical counter-contact for the piezo-ceramic layer.

11. A communication terminal as claimed in claim 10, wherein the electrical counter-contact for the piezo-ceramic layer is applied to a direct-current balancing potential.

12. A communication terminal as claimed in claim 1, wherein the antenna is one of a patch antenna and a PIFA antenna.

* * * * *